(12) United States Patent
Kavunder et al.

(10) Patent No.: US 12,688,140 B2
(45) Date of Patent: Jul. 21, 2026

(54) ETHERNET NETWORK EQUIPMENT WITH REPLACEABLE SYSTEM-ON-MODULE CORE

(71) Applicant: AT&T Intellectual Property I, L.P.,
Atlanta, GA (US)

(72) Inventors: Arun Kavunder, Frisco, TX (US);
Ramesh Thyagarajan, Frisco, TX
(US); Andrew Luecke, Kennedale, TX
(US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 72 days.

(21) Appl. No.: 18/966,098

(22) Filed: Dec. 2, 2024

(65) Prior Publication Data

US 2026/0154225 A1 Jun. 4, 2026

(51) Int. Cl.
*G06F 13/40* (2006.01)

(52) U.S. Cl.
CPC ...... *G06F 13/4068* (2013.01); *G06F 2213/40* (2013.01)

(58) Field of Classification Search
CPC ............. G06F 13/4068; G06F 2213/40; G06F 13/409; G06F 13/40
See application file for complete search history.

(56) References Cited

U.S. PATENT DOCUMENTS 9,639,497 B2 * 5/2017 Douglas .............. G06F 13/4022
10,007,634 B2 * 6/2018 Dubal ................. G06F 13/4282
12,457,700 B2 * 10/2025 Chiu ...................... G06F 1/185

* cited by examiner

*Primary Examiner* — Idriss N Alrobaye
*Assistant Examiner* — Richard B Franklin

(57) ABSTRACT

An apparatus of the present disclosure may include a baseboard, the baseboard including: a baseboard management controller, an Ethernet bus, a first edge connector for at least one network interface module, and a second edge connector for a system-on-module. The at least one network interface module may be coupled to the Ethernet bus via the first edge connector. In addition, the system-on-module may be coupled to the Ethernet bus via the second edge connector. The system-on-module may include a system-on-chip and an Ethernet edge connection module coupled to the Ethernet bus via the second edge connector of the baseboard.

20 Claims, 4 Drawing Sheets

<u>100</u>

100

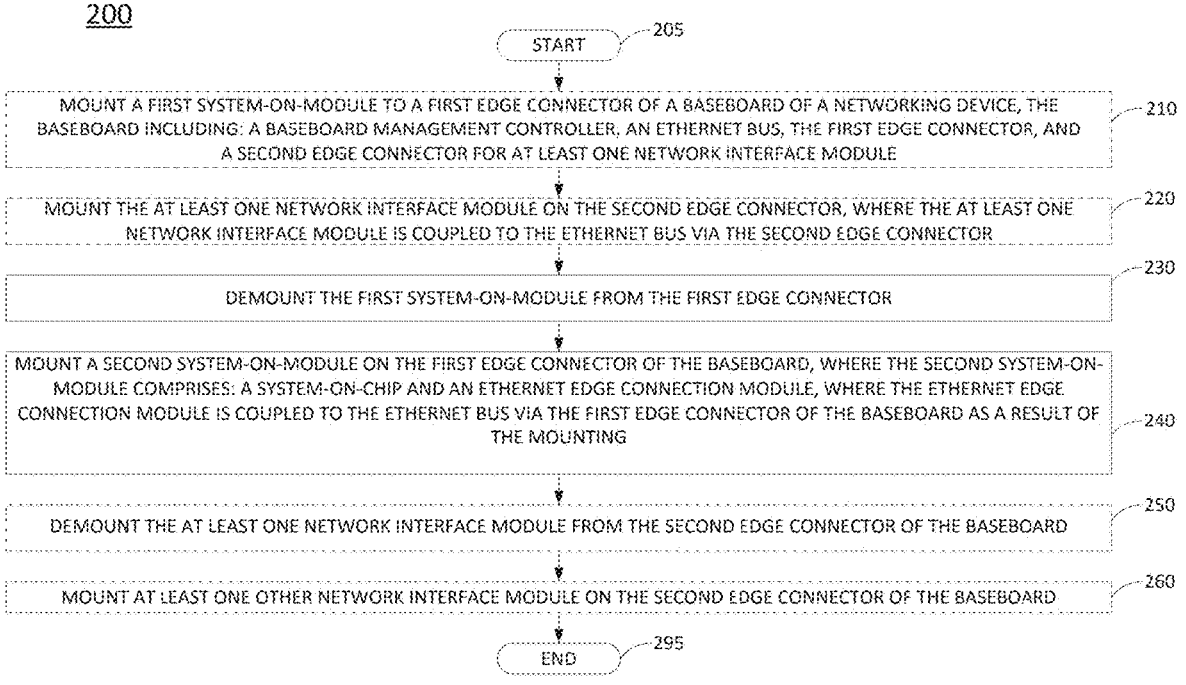

200

START ⟍ 205

MOUNT A FIRST SYSTEM-ON-MODULE TO A FIRST EDGE CONNECTOR OF A BASEBOARD OF A NETWORKING DEVICE, THE BASEBOARD INCLUDING: A BASEBOARD MANAGEMENT CONTROLLER, AN ETHERNET BUS, THE FIRST EDGE CONNECTOR, AND A SECOND EDGE CONNECTOR FOR AT LEAST ONE NETWORK INTERFACE MODULE ⟍ 210

MOUNT THE AT LEAST ONE NETWORK INTERFACE MODULE ON THE SECOND EDGE CONNECTOR, WHERE THE AT LEAST ONE NETWORK INTERFACE MODULE IS COUPLED TO THE ETHERNET BUS VIA THE SECOND EDGE CONNECTOR ⟍ 220

DEMOUNT THE FIRST SYSTEM-ON-MODULE FROM THE FIRST EDGE CONNECTOR ⟍ 230

MOUNT A SECOND SYSTEM-ON-MODULE ON THE FIRST EDGE CONNECTOR OF THE BASEBOARD, WHERE THE SECOND SYSTEM-ON-MODULE COMPRISES: A SYSTEM-ON-CHIP AND AN ETHERNET EDGE CONNECTION MODULE, WHERE THE ETHERNET EDGE CONNECTION MODULE IS COUPLED TO THE ETHERNET BUS VIA THE FIRST EDGE CONNECTOR OF THE BASEBOARD AS A RESULT OF THE MOUNTING ⟍ 240

DEMOUNT THE AT LEAST ONE NETWORK INTERFACE MODULE FROM THE SECOND EDGE CONNECTOR OF THE BASEBOARD ⟍ 250

MOUNT AT LEAST ONE OTHER NETWORK INTERFACE MODULE ON THE SECOND EDGE CONNECTOR OF THE BASEBOARD ⟍ 260

END ⟍ 295

FIG. 2

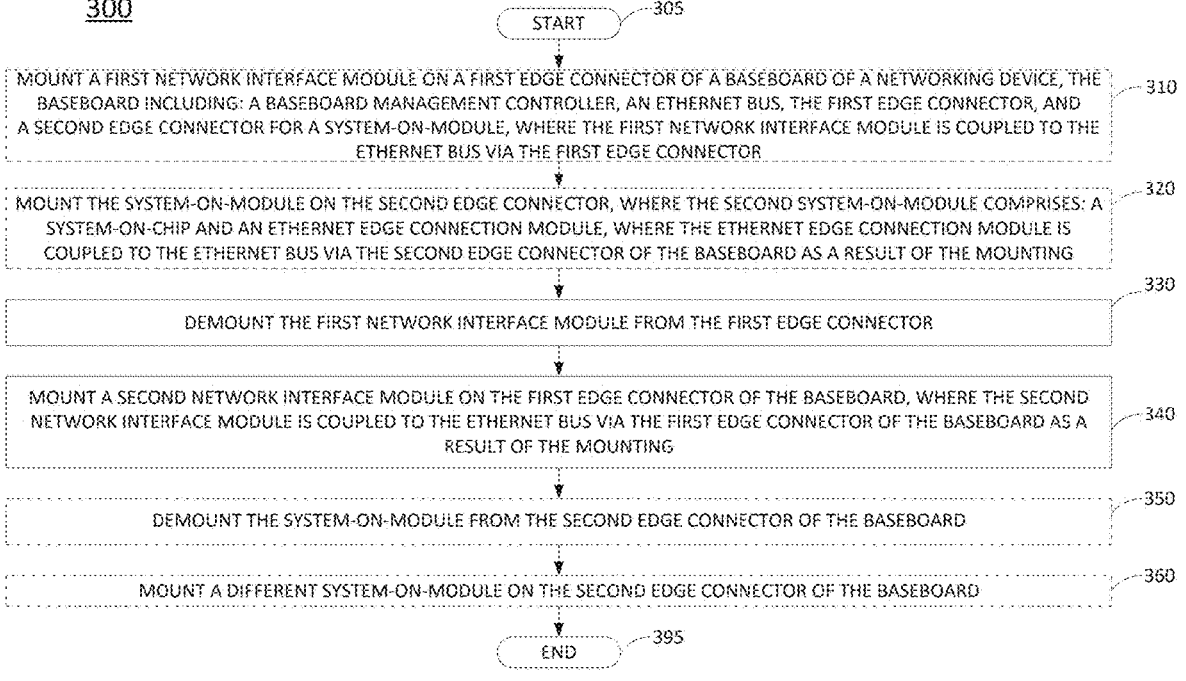

300

START ⟩—305

MOUNT A FIRST NETWORK INTERFACE MODULE ON A FIRST EDGE CONNECTOR OF A BASEBOARD OF A NETWORKING DEVICE, THE
BASEBOARD INCLUDING: A BASEBOARD MANAGEMENT CONTROLLER, AN ETHERNET BUS, THE FIRST EDGE CONNECTOR, AND
A SECOND EDGE CONNECTOR FOR A SYSTEM-ON-MODULE, WHERE THE FIRST NETWORK INTERFACE MODULE IS COUPLED TO THE
ETHERNET BUS VIA THE FIRST EDGE CONNECTOR
—310

MOUNT THE SYSTEM-ON-MODULE ON THE SECOND EDGE CONNECTOR, WHERE THE SECOND SYSTEM-ON-MODULE COMPRISES: A
SYSTEM-ON-CHIP AND AN ETHERNET EDGE CONNECTION MODULE, WHERE THE ETHERNET EDGE CONNECTION MODULE IS
COUPLED TO THE ETHERNET BUS VIA THE SECOND EDGE CONNECTOR OF THE BASEBOARD AS A RESULT OF THE MOUNTING
—320

DEMOUNT THE FIRST NETWORK INTERFACE MODULE FROM THE FIRST EDGE CONNECTOR
—330

MOUNT A SECOND NETWORK INTERFACE MODULE ON THE FIRST EDGE CONNECTOR OF THE BASEBOARD, WHERE THE SECOND
NETWORK INTERFACE MODULE IS COUPLED TO THE ETHERNET BUS VIA THE FIRST EDGE CONNECTOR OF THE BASEBOARD AS A
RESULT OF THE MOUNTING
—340

DEMOUNT THE SYSTEM-ON-MODULE FROM THE SECOND EDGE CONNECTOR OF THE BASEBOARD
—350

MOUNT A DIFFERENT SYSTEM-ON-MODULE ON THE SECOND EDGE CONNECTOR OF THE BASEBOARD
—360

END ⟩—395

FIG. 3

ETHERNET NETWORK EQUIPMENT WITH REPLACEABLE SYSTEM-ON-MODULE CORE

The present disclosure relates to networking equipment, such as customer premises equipment (CPEs), and more particularly describes apparatuses comprising networking equipment with field-replaceable system-on-modules and field-replaceable network interface modules. The present disclosure also describes methods for demounting a first system-on-module and mounting a second system-on-module, and describes methods for demounting a first network interface module and mounting a second network interface module.

BRIEF DESCRIPTION OF THE DRAWINGS

The teaching of the present disclosure can be readily understood by considering the following detailed description in conjunction with the accompanying drawings, in which:

FIG. 2 illustrates a flowchart of an example method for demounting a first system-on-module and mounting a second system-on-module;

FIG. 3 illustrates a flowchart of an example method for demounting a first network interface module and mounting a second network interface module.

To facilitate understanding, identical reference numerals have been used, where possible, to designate identical elements that are common to the figures.

DETAILED DESCRIPTION

Figure 1:
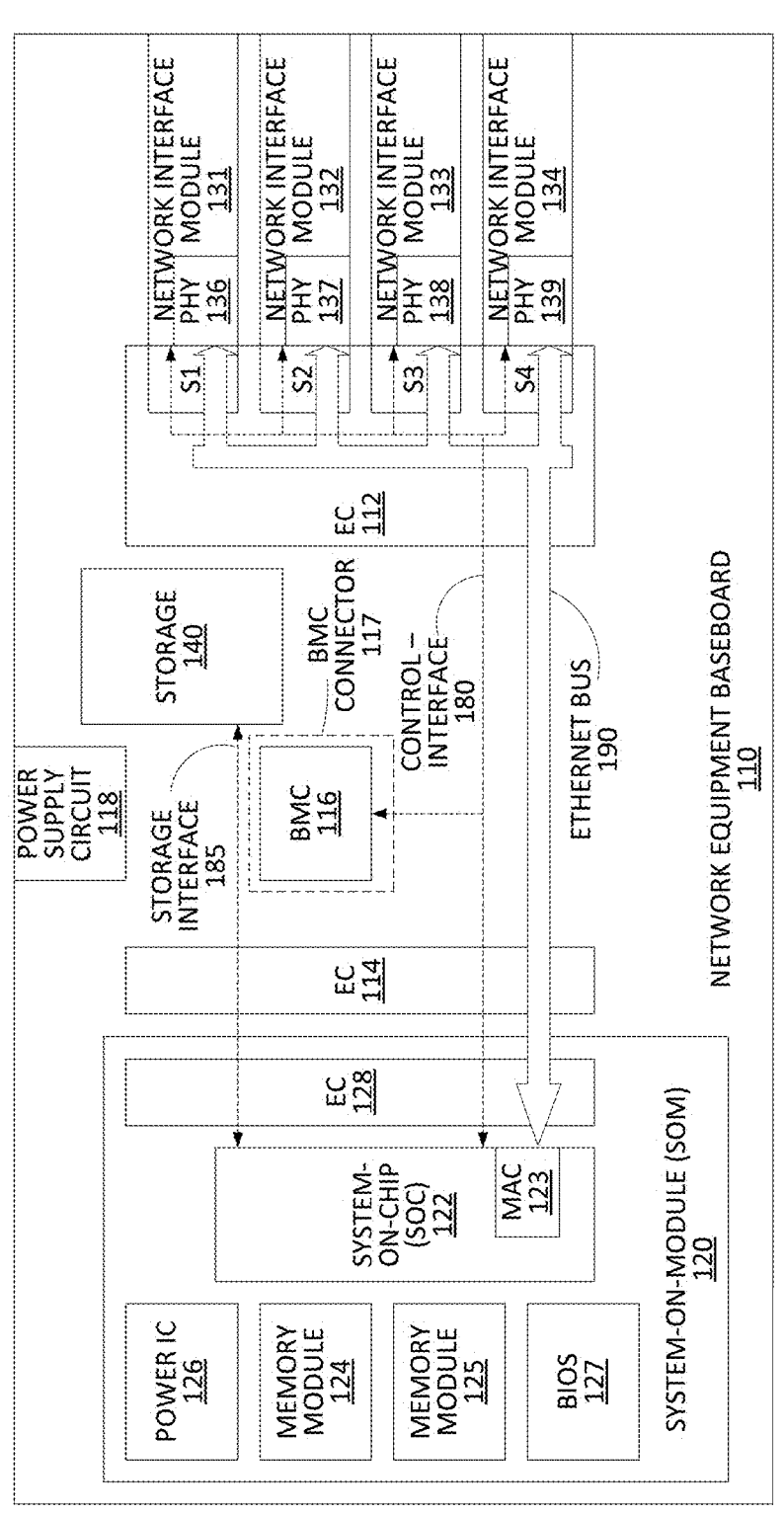
FIG. 1 illustrates an example networking apparatus of the present disclosure with a replaceable system-on-module and replaceable network interface modules.

Apparatuses comprising networking equipment with field-replaceable system-on-modules and field-replaceable network interface modules are disclosed. For instance, an example apparatus of the present disclosure may include a baseboard, the baseboard including: a baseboard management controller, an Ethernet bus, a first edge connector for at least one network interface module, and a second edge connector for a system-on-module. The at least one network interface module may be coupled to the Ethernet bus via the first edge connector. In addition, the system-on-module may be coupled to the Ethernet bus via the second edge connector. The system-on-module may include a system-on-chip and an Ethernet edge connection module coupled to the Ethernet bus via the second edge connector of the baseboard.

In addition, a method for demounting a first system-on-module and mounting a second system-on-module is disclosed. For instance, an example method may include demounting a first system-on-module from a first edge connector of a baseboard of a networking device. In one example, the baseboard may include a baseboard management controller, an Ethernet bus, the first edge connector, and a second edge connector for at least one network interface module. In one example, the first edge connector may be configured to receive a system-on-module from among a plurality of available system-on-modules, where the plurality of available system-on-modules includes the first system-on-module. In addition, in one example, the at least one network interface module may be coupled to the Ethernet bus via the second edge connector. The method may further include mounting a second system-on-module on the first edge connector of the baseboard. In one example, the second system-on-module may include a system-on-chip and an Ethernet edge connection module, where the Ethernet edge connection module may be coupled to the Ethernet bus via the first edge connector of the baseboard as a result of the mounting.

An additional method for demounting a first network interface module and mounting a second network interface module is also disclosed. For instance, an example method may include demounting a first network interface module from a first slot of a first edge connector of a baseboard of a networking device. The baseboard may include a baseboard management controller, an Ethernet bus, the first edge connector, and a second edge connector for a system-on-module. In one example, the first edge connector may comprise a plurality of slots configured to receive a plurality of network interface modules. In one example, the system-on-module may include a system-on-chip and an Ethernet edge connection module, where the Ethernet edge connection module may be coupled to the Ethernet bus via the second edge connector. The method may further include mounting a second network-interface module on the first slot of the first edge connector of the baseboard, where the second network interface module may be coupled to the Ethernet bus via the first edge connector of the baseboard as a result of the mounting.

To illustrate, examples of the present disclosure may include networking devices, e.g., customer premises equipment (CPE) and/or network termination equipment (NTE) that enable mixing and matching of interfaces, transport technologies, and compute capabilities to create multiple types of networking devices to support a variety of software to serve disparate roles in a communication network. In particular, example networking equipment of the present disclosure may be vendor independent, and may support carrier or end-user upgrade paths over the lifecycles of the devices in a cost-effective manner. Notably, the current CPE/NTE landscape may be dominated by vendor-specific, one-off designs, which may be cost effective, but which are severely limited in modularity and expandability. For instance, prevailing designs may be use case-specific and it may be challenging or not possible to repurpose for other use cases.

In one example, the present disclosure may provide for extensibility and upgradability of CPEs/NTEs by utilizing a design architecture in which a system-on-chip (SOC) with an Ethernet interface is mounted on a system-on-module (SOM), and where an installed SOM may be easily swapped with a new SOM for upgradability as well as reuse of various other components. In addition, in one example, a design architecture of the present disclosure may include slots for port interface modules (PIMs), also referred to herein as network interface modules, that connect to the SOC via Ethernet. For instance, a baseboard of the present disclosure may include an Ethernet bus connecting the SOM with SOC to the PIM(s). It should be noted that the PIM slots may also enable the swapping of PIMs, providing flexibility in the types of customer-facing and wide area network (WAN)-facing interfaces that may be accommodated. As such, examples of the present disclosure enable processing power improvements by making the SOC upgradable by putting the SOC on a SOM (which is a field- or customer-replaceable module). In one example, the present disclosure may add storage upgradability by externalizing the storage on an off the shelf storage module, such as a non-volatile memory express (NVME or NVMe) module, a secure digital (SD) extreme capacity (SDXC) module, a SD ultra-capacity (UC) module, or the like. In one example, memory capacity of networking equipment of the present disclosure (e.g., random access memory (RAM) may also be field-upgrade-able to provide additional flexibility in adapting base networking equipment to different use case-specific capabilities. In addition, in one example, a baseboard management controller (BMC) may also have a replaceable form factor like the main SOM so that it can be upgraded independent of the SOM and baseboard. The edge connectors for the SOM and the BMC may be different types of connectors such as edge connectors, press fit connectors, backplane connectors, Rambus Inline Memory Module (RIMM) connectors, dual in-line memory module (DIMM) connectors, small outline (SO)-DIMM connectors, etc. The ability to swap SOM, BMC, and other field-replaceable unit (FRU) modules along with the baseboard allows CPEs/NTEs of the present disclosure to weather component end of sales/end of life-driven redesigns to not affect the life expectancy of the device/system as it allows for continuous evolution over time.

Notably, examples of the present disclosure adopt Ethernet as a common interface between a system-on-module (SOM) and port interface modules (PIMs) in a networking device, e.g., a CPE/NTE or the like. For instance, while different types of transport technologies are converging to Ethernet as a ubiquitous standard, different types of Ethernet implementations are prevalent, such as: electrical, optical, coherent, non-coherent, small form-factor pluggable (SFP) types, Ethernet speeds that vary from 100 Mbps to 400 Gbps and beyond, and so forth. It should also be noted that prior modularization efforts may utilize peripheral component interface (PCI), PCI Express (PCI-E or PCIe), Universal Serial Bus (USB), and/or proprietary interfaces that may be inefficient, e.g., due to externalization of media access controllers (MAC) and physical transceiver modules (PHYs) to support different transport/interface types. For instance, such designs may result in lower performance due at least in part to the overhead of PCI/PCI-E bus being inefficient for packet transfers to in-line accelerators or processor cores (e.g., central processing unit (CPU) cores). In contrast, a baseboard comprising an Ethernet bus in accordance with the present disclosure provides for accelerated packet processing between PIM PHYs and an Ethernet MAC of an installed SOM.

Thus, examples of the present disclosure provide networking equipment that can be repurposed for multiple transport technologies, port speeds, port types, use cases, software features, and so forth. As such, examples of the present disclosure may reduce inventory requirements by eliminating the need to carry niche device models to address disparate customer requirements. Examples of the present disclosure may also reduce waste by allowing for the swapping and upgrade of individual components, saving other components from being prematurely discarded. In addition, the time to upgrade may be reduced for various network equipment. For instance, increasing volumes of SOM modules used in a large communication network may reduce time in design/development, manufacturing, and software development, and may also reduce design, development, and support costs. In particular, a network operator may be enabled to keep a communication network in a close-to-state-of-the-art condition using current generational components (and/or prevent the communication network from becoming outdated) through efficient incremental upgrades of SOM, PIMs, RAM, and/or storage. These and other aspects of the present disclosure are discussed in greater detail below in connection with the examples of FIGS. 1-4.

To aid in understanding the present disclosure, FIG. 1 illustrates an example networking device 100, e.g., an apparatus, in accordance with the present disclosure. In particular, the network device 100 may include a network equipment baseboard 110. The network equipment baseboard 110 may comprise a baseboard management controller (BMC) 116, an Ethernet bus 190, a first edge connector (EC) 112 (e.g., for mounting/installing at least one network interface module), and a second edge connector (EC) 114 (e.g., for mounting/installing a system-on-module (SOM)). To further illustrate, the first edge connector 112 may comprise a pluggable interface to receive at least one network interface module. For instance, in the present example, the first edge connector 112 may comprise at least four slots/ports S1-S4 for receiving at least four network interface modules. For example, as illustrated in FIG. 1, slots S1-S4 may be occupied by network interface modules 131-134. However, it should be noted that although the example of FIG. 1 illustrates all of the slots S1-S4 being occupied, in another example, at least one of the slots S1-S4 may be unoccupied and available for future installation of another network interface module.

In accordance with the present disclosure, the network interface modules 131-134 may comprise or may be referred to as network adapter modules, port interface modules (PIMs), line cards, or the like. To further illustrate, in one example, the network interface modules 131-134 may each comprise one of: a small form-factor pluggable (SFP) module, an enhanced SFP module (SFP+), a gigabit Ethernet SFP (GE-SFP) module, a power-over-Ethernet (POE) SFP module, and so forth. It should be noted that in various examples, network interface modules of differing types may be installed in respective ones of the slots S1-S4. In one example, each of the network interface modules 131-134 (and/or other network interface modules that may alternatively be installed in any of slots S1-S4) may comprise/ include an Ethernet physical layer transceiver (PHY or Ethernet PHY), e.g., a respective one of PHYs 136-139.

The second edge connector 114 may similarly comprise a pluggable interface to receive a system-on-module (SOM). However, instead of a plurality of slots, there may be a set of pins to receive a single SOM at a time, e.g., in the example of FIG. 1, SOM 120 may be presently installed. Thus, it should be noted that the SOM 120 is removable from the second edge connector 114 for installation of a second system-on-module. In other words, SOM 120 is not permanently affixed, e.g., soldered, glued, etc. to the baseboard 110 via the second edge connector 114 (or otherwise). For present purposes, soldered may be considered "permanent" as it is not easily removed without significant labor and/or potential risk in damaging other components on the baseboard. In contrast, the second edge connector 114 may allow for the SOM 120 to snap-in-place (but could also include a latch to hold it down, or one or several screws that are easily removed and reused for a subsequent system-on-module, etc.).

As further illustrated in FIG. 1, the SOM 120 may include a system-on-chip (SOC) 122, memory modules 124-125 (e.g., random access memory (RAM)), a power integrated circuit (IC) 126, a basic input-output system (BIOS) module 127, and an on-board edge connector 128, which may be complementary to the second edge connector 114 of the baseboard 110. The SOC 122 may include one or more processors/cores (e.g., a central processing unit (CPU), an application specific integrated circuit (ASIC), a field-programmable gate array (FPGA), etc. In some examples, the SOC 122 may further include a graphics processing unit (GPU), and interfaces for memory and storage. For instance, in the example of FIG. 1, the SOM 120 includes two memory modules 124-125, which may be in communication with SOC 122 via such a memory interface. In the example of FIG. 2, a storage component 140 may be installed, e.g., in a designated location on the baseboard 110, and may be in communication with SOC 122 via a storage interface 185 via the second edge connector 114 and an on-board edge connector 128 of the SOM 120. For instance, the second edge connector 114 may include one or more receptacles for receiving corresponding input/output (I/O) pin(s) of SOM 120 (or may comprise one or more pins for coupling to one or more I/O receptacles of SOM 120). In one example, the storage module 140 may comprise a non-volatile memory express (NVME or NVMe) module, a secure digital (SD) extreme capacity (SDXC) module, a SD ultra-capacity (UC) module, or the like. As such, the storage interface 185 may comprise a physical link via which SOC 122 and storage module 140 may communicate via an peripheral component interconnect (PCI) protocol, such as PCI express (PCIe), a serial peripheral interface (SPI) protocol, or the like. It should be noted that the present example illustrates memory modules 124-125 being components of SOM 120, while storage module 140 is external to the SOM 120. However, in another example, storage module 140 may comprise a component of SOM 120, may be installed/attached to SOM 120 (e.g., in a stack arrangement), or the like. Alternatively, or in addition, memory modules 124-125 may be external to SOM 120, and may be in communication with SOC 122 via another interface, e.g., via on-board edge connector 128 and the second edge connector 114 of the baseboard 110. In still another example, SOM 120 may include on-board memory modules 124-125 and may have additional/expansion memory accessible via the on-board edge connector 128 and the second edge connector 114 of the baseboard 110. For instance, the baseboard 110 may include expansion slots for additional memory, e.g., accessible via PCI, PCIe, or the like, or the additional memory may be external to the baseboard 110 (and/or external to the networking device 110) and accessed via direct memory access (DMA) or the like. In addition, the BIOS module 127 being installed on the SOM 120 enables the SOC 120 to bootstrap, enumerate the attached devices, and access the operating system (OS), e.g., via the storage module 140. However, it should be noted that the OS can be installed either by the BMC 116 or the SOC 122 while running the OS.

The SOC 122 may further include an Ethernet edge connection module, e.g., media access controller (MAC) 123. For instance, SOC 122 via MAC 123 may be enabled to engage in Ethernet-based communication with at least one computing device external to the networking device 100 via the Ethernet bus 190 and at least one of the network interface modules 131-134. To further illustrate, the second edge connector 114 may include one or more receptacles for receiving corresponding input/output (I/O) pin(s) of SOM 120 (or may comprise one or more pins for coupling to one or more I/O receptacles of SOM 120) that are designated for the Ethernet bus 190. The Ethernet bus 190 may comprise a set of physical connections, e.g., lanes, on the baseboard 110 for connecting the SOM 120 (and more specifically the MAC 123 of SOC 122) to the respective network interface modules 131-134 (and more specifically the PHYs 136-139 thereof). In one example, the Ethernet bus 190 may comprise physical components (e.g., traces, vias, wiring, etc.) of the baseboard 110 which may comprise, provide, or support a media independent interface (MII) for the MAC 123 to communicate with at least one of the PHYs 136-139. In various examples, the media independent interface (MII) may comprise a gigabit media independent interface (GMII), a serial gigabit media independent interface (SG-MII), a quad serial gigiabit media independent interface (QSGMII), a 10-gigabit media independent interface (XG-MII), a universal serial gigabit media independent interface (USGMII), or the like, e.g., with backwards compatibility and/or cross-compatibility with multiple MII types. With respect to serial-based MIIs, the MAC 123 may comprise a multi-port MAC operating over serial links. For example, Ethernet bus 190 may comprise multi-port MAC traces connected to different PHYs 136-139, which may themselves be capable of terminating multiple such universal serial MAC links per PIM. To further illustrate, if the SOC 122 (e.g., MAC 123 thereof) supports 16×100G MAC ports, the Ethernet bus 190 traces may comprise 16×100G, utilizing technologies such as non-return-to-zero (NRZ), four-level pulse amplitude modulation (PAM4), or future serial technology links. Each of the network interface modules 131-134 may then terminate 4×100G links. In addition, the PHYs 136-139 may comprise either 1×quad 100G PHYs or 4×100G PHYs. In any case, an Ethernet bus (such as Ethernet bus 190) in accordance with the present disclosure provides for accelerated packet processing between PIM PHYs and an Ethernet MAC of an installed SOM (or SOC thereof), e.g., in contrast to other designs that may externalize MACs and PHYs to support different transport/interface types. In addition, although FIG. 1 illustrates that MAC 123 is a component of SOC 122, it should be noted that in another example, the Ethernet edge connection module (e.g., MAC 123) may be a component of the SOM 120 that is distinct from the SOC 122.

For the sake of completeness, it is also noted that the baseboard 110 may further include a control interface 180, which may couple SOM 120 (and/or the SOC 122 thereof) to baseboard management controller 116. In one example, the control interface 180 may further couple SOM 120 (and/or the SOC 122 thereof) and/or the BMC 116 to respective ones of the network interface modules 131-134. For instance, some or all of the network interface modules 131-134 may include on-board microcontrollers, that may be configured by BMC 116 and/or SOC 122, e.g., for power consumption, wavelength selection (e.g., for optical transceivers on the WAN side), etc. In one example, the control interface 180 may comprise, provide, and/or support a serial communication bus, such as an inter-integrated circuit (I2C) bus, or the like. As further shown in FIG. 1, the baseboard 110 may also include a power supply circuit 118, e.g., an alternating current (AC) to direct current (DC) converter to provide DC electrical power to various components of network device 100 via the baseboard 110. For ease of illustration, none of the power delivery lines of baseboard 110 connecting power supply circuit 118 to other components are shown in FIG. 1. In addition, control bus(es)/control line(s), e.g., from BMC 116 to power supply circuit 118 and/or from SOM 120 to power supply circuit 118, are omitted from illustration in FIG. 1. However, it should be understood that in one example, these busses/control lines may comprise or may support a System Management Bus (SMB), or SMB-based communications. As noted above, in one example, BMC 116 may also have a replaceable form so that it can be upgraded independent of SOM 120 and baseboard 110. In such an example, the BMC connector 117 that may connect the BMC 116 to the baseboard 110 and to the control interface 180 may be the same or a different type of connector as the edge connector(s) 112, 114, and/or 128, such as a press fit connector, a backplane connector, a RIMM connector, a DIMM connector, a SO-DIMM connector, etc.

It should be noted that FIG. 1 illustrates just one example of a networking device 100 (e.g., a CPE/NTE) in accordance with the present disclosure. Accordingly, it should be understood that other, further, and different examples may include more or less components, may have components installed in a different configuration, layout, arrangement, and/or design, and so forth. For instance, as noted above, in another example, the storage module 140 may be external to the baseboard 110 and/or the networking device 120 (or another storage module of the networking device 100 may external to the baseboard 110 in addition to the storage module 140). As another example, the MAC 123 may be a component of the SOM 120 that that is external to the SOC 122. In still another example, the first edge connector 112 may include additional slots for additional network interface modules, which at any given time may be free and available for installation of new network interface module(s), or which may be occupied by other network interface module(s). In addition, at another instance in time, the networking device 100 may include a different SOM installed instead of SOM 120 (e.g., with enhanced processing hardware resource and/or capability, with enhanced memory resources, etc.), may include one or more different network interface modules installed, and so forth. Thus, these and other modifications are all contemplated within the scope of the present disclosure.

FIG. 2 illustrates a flowchart of an example method 200 for demounting a first system-on-module and mounting a second system-on-module. In one example, the steps, functions, or operations of method 200 may relate to or be performed in connection with a networking device such as described in connection with FIG. 1, or the like. The method 200 begins at step 205 and may proceed to optional step 210, optional step 220, or step 230.

To illustrate, optional step 210 may include mounting a first system-on-module (SOM) on a first edge connector of a baseboard of a networking device, where the baseboard may include a baseboard management controller, an Ethernet bus, the first edge connector, and a second edge connector for at least one network interface module. In particular, the first edge connector may be configured to receive a SOM from among a plurality of available SOMs, where the plurality of available SOMs includes the first SOM. In this regard, it should be noted that the "first" edge connector as referred to in connection with the present method 200 may comprise the "second" edge connector 114 of FIG. 1.

Optional step 220 may include mounting at least one network interface module on the second edge connector of the baseboard. For instance, the at least one network interface module may be installed in at least one slot of the second edge connector of the baseboard. As such, the at least one network interface module may be coupled to the Ethernet bus via the second edge connector. In this regard, it should be noted that the "second" edge connector as referred to in connection with the present method 200 may comprise the "first" edge connector 112 of FIG. 1. In various examples, the at least one network interface module may comprise an SFP module, an SFP+module, a GE-SFP module, a PoE SFP module, and so forth. In addition, it should be noted that the at least one network interface module may include an Ethernet physical layer module, e.g., a PHY or physical layer transceiver.

Step 230 may include demounting the first SOM from the first edge connector. For instance, the first edge connector may comprise a set of receptacles to receive a set of pins of any SOM of the appropriate configuration, e.g., the same number of pins as receptacles, with proper alignment, with complementary pin and receptacle sizing, etc. In another example, the first SOM may comprise receptacles to receive pins of the first edge connector. In any case, step 230 may include hand-removal of the first SOM, e.g., with only human hands, or with simple tools such as a screwdriver, pry tool, tweezers, or the like (e.g., without the need to de-solder the electrical connections).

Step 240 may include mounting a second system-on-module (SOM) on the first edge connector of the baseboard. For instance, similar to step 230, the mounting of the second SOM may be by-hand, e.g., with only human hands, or with simple tools such as a screwdriver, pry tool, tweezers, or the like (e.g., without the need to solder the electrical connections). It should be noted that in accordance with the present disclosure, the second SOM may include a system-on-chip (SOC) and an Ethernet edge connection module, where the Ethernet edge connection module is coupled to the Ethernet bus via the first edge connector of the baseboard as a result of the mounting. In one example, the Ethernet edge connection module may be a component of the SOC. In another example, the Ethernet edge connection module may be a separate component of the second SOM that is distinct from the SOC. In one example, the Ethernet edge connection module may comprise an Ethernet MAC. As a result of the mounting, the Ethernet edge connection module is further enabled to engage in Ethernet-based communication with at least one computing device external to the apparatus via the Ethernet bus and the at least one network interface module (e.g., and an Ethernet PHY thereof). For the sake of completeness, it should be noted that the first SOM that has been demounted may have a similar configuration (e.g., comprising at least a SOC and having an Ethernet edge connection module). However, in one example, the second SOM may have, for example, a superior processing speed, memory size, etc.

In one example, following step 240, the method 200 may proceed to optional step 250. Optional step 250 may include demounting the at least one network interface module from the second edge connector of the baseboard. In addition, in such an example, optional step 260 may include mounting at least one other network interface module on the second edge connector of the baseboard, e.g., in a slot, or slots vacated by the network interface module(s) removed/demounted at optional step 250. Following step 240, or one of the optional steps 250-260, the method 200 proceeds to step 295 where the method 200 ends.

It should be noted that the method 200 may be expanded to include additional steps, or may be modified to replace steps with different steps, to combine steps, to omit steps, to perform steps in a different order, and so forth. For instance, in one example one or more steps of the method 200 may be repeated, such as steps 230-240, and so forth. For instance, the method 200 may continue to be performed, in whole or in part, on an ongoing basis, to replace/upgrade the SOM. In one example, optional step 250, or optional steps 250-260 may precede step 230. Similarly, in one example, optional step 220 may precede optional step 210. In one example, the method 200 may be expanded or modified to include steps, functions, and/or operations, or other features described above in connection with the example(s) of FIG. 1, as described below in connection the example method 300 of FIG. 3, or as described elsewhere herein. Likewise, the network apparatus associated with the present method 200 may have any configuration as described herein, or similar. Thus, these and other modifications are all contemplated within the scope of the present disclosure.

FIG. 3 illustrates a flowchart of an example method 300 for demounting a first network interface module and mounting a second network interface module. In one example, the steps, functions, or operations of method 300 may relate or be performed in connection with a networking device such as described in connection with FIG. 1, or the like. The method 300 begins at step 305 and may proceed to optional step 310, optional step 320, or step 330.

To illustrate, optional step 310 may include mounting a first network interface module on a first edge connector of a baseboard of a networking device, where the baseboard may include a baseboard management controller, an Ethernet bus, the first edge connector, and a second edge connector for a system-on-module (SOM). It should be noted that the first edge connector may include a plurality of slots configured to receive a plurality of network interface modules. For instance, for purposes of the present method 300, the first edge connector may be the same as or similar to the first edge connector 112 of FIG. 1. In various examples, the first network interface module may comprise an SFP module, an SFP+module, GE-SFP module, a PoE SFP module, and so forth. In addition, it should be noted that the first network interface module may include an Ethernet physical layer module, e.g., a PHY or physical layer transceiver. In one example, optional step 310 may comprise the same or similar operations as optional step 220 of the example method 200 of FIG. 2, as discussed above.

Optional step 320 may include mounting a SOM on the second edge connector of the baseboard. For instance, optional step 320 may include the same or similar operations as optional step 210 of the example method 200 of FIG. 2, as discussed above. In this regard, it should be noted that the "second" edge connector as referred to in connection with the present method 300 may comprise be the same as or similar to the second edge connector 114 of FIG. 1. It should be noted that in accordance with the present disclosure, the SOM may include a system-on-chip (SOC) and an Ethernet edge connection module, where the Ethernet edge connection module is coupled to the Ethernet bus via the second edge connector of the baseboard, e.g., as a result of the mounting. In one example, the Ethernet edge connection module may also be a component of the SOC. In another example, the Ethernet edge connection module may be a separate component of the SOM that is distinct from the SOC. In one example, the Ethernet edge connection module may comprise an Ethernet MAC.

Step 330 may include demounting the first network interface module from the first edge connector, e.g., where the first edge connector comprises a plurality of slots configured to receive a plurality of network interface modules. For instance each slot may comprise a receptacle or a set of receptacles to receive any network interface module of the appropriate configuration, e.g., the same/complementary sizing, the same number of pins and receptacles, respectively, etc. In any case, step 230 may include hand-removal of the first network interface module, e.g., with only human hands, or with simple tools such as a screwdriver, pry tool, tweezers, or the like (e.g., without the need to de-solder the electrical connections). In one example, step 330 may comprise the same or similar operations as optional step 250 of the example method 200 of FIG. 2.

Step 340 may include mounting a second network interface module on the first edge connector of the baseboard.

For instance, similar to step 330, the mounting of the second network interface module may be by-hand, e.g., with only human hands, or with simple tools such as a screwdriver, pry tool, tweezers, or the like (e.g., without the need to solder the electrical connections). Accordingly, the second network interface module is coupled to the Ethernet bus via the first edge connector of the baseboard as a result of the mounting. In addition, as a result of the mounting, the Ethernet edge connector module is enabled to engage in Ethernet-based communication with at least one computing device external to the networking device via the Ethernet bus and the second network interface module.

In one example, following step 340, the method 300 may proceed to optional step 350. Optional step 350 may include demounting the SOM from the second edge connector of the baseboard. In addition, in such an example, optional step 360 may include mounting a different SOM on the second edge connector of the baseboard. In one example, optional steps 350 and 360 may comprise the same or similar operations as steps 230 and 240 of the example method 200 of FIG. 2. Following step 340, or one of optional steps 350-360, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example one or more steps of the method 300 may be repeated, such as steps 330-340, steps 330-360, and so forth. For instance, the method 300 may continue to be performed, in whole or in part, on an ongoing basis, to replace/upgrade network interface module(s). In one example, optional step 350, or optional steps 350-360 may precede step 330. Similarly, in one example, optional step 320 may precede optional step 310. In one example, the method 300 may be expanded or modified to include steps, functions, and/or operations, or other features described above in connection with the example(s) of FIG. 1 and/or FIG. 2, or as described elsewhere herein. Likewise, the network apparatus associated with the present method 300 may have any configuration as described herein, or similar. Thus, these and other modifications are all contemplated within the scope of the present disclosure.

In addition, although not expressly specified above, one or more steps of the example method 200 or the example method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 and/or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 4:
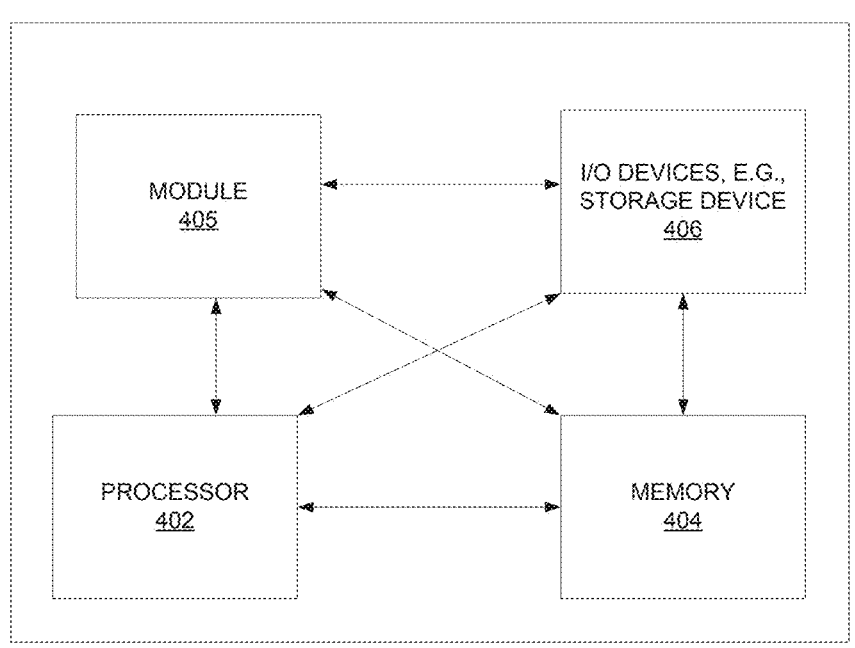
FIG. 4 illustrates an example high-level block diagram of a computer specifically programmed to perform the steps, functions, blocks, and/or operations described herein.

FIG. 4 depicts a high-level block diagram of a computing device or processing system 400 specifically programmed to perform functions described herein, e.g., of a networking device/apparatus, such as a CPE, NTE, etc. For example, the processing system 400 of FIG. 4 may represent a networking device 100 as illustrated in FIG. 1 or described in connection with the above method(s). As depicted in FIG. 4, the processing system 400 comprises one or more hardware processor elements 402 (e.g., a microprocessor, a central processing unit (CPU) and the like). For instance, the one or more hardware processor elements 402 may represent an SOM, or an SOC that is a component of an SOM. Processing system 400 may further include a memory 404, (e.g., random access memory (RAM), read only memory (ROM), a disk drive, an optical drive, a magnetic drive, and/or a Universal Serial Bus (USB) drive), etc. For instance, memory 404 may represent a memory component of a SOM of the present disclosure and/or may represent a memory component mounted elsewhere on a baseboard that is external to the SOM. Module 405 may represent instructions, code, configuration values/settings, and so forth to implement functions of a networking device, e.g., for a particular use case, or networking device type. For instance, as described above, a modular networking device of the present disclosure may have replaceable SOMs and network interface modules, and may be configured for various specific networking use cases, such as a CPE/NTE (and alternatively a network edge (NE) router, a router for local routing within a data center, etc.). In one example, all or a portion of module 405 may be stored in a storage device of the processing system (e.g., mounted to the baseboard and or accessible via USB, PCIe, SBI, etc.) and/or loaded into memory 404 for execution by hardware processor element(s) 402. Processing system 400 may further include various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). For instance, input/output devices 406 may represent network interface modules as described herein, e.g., SFP, SFP+, etc.

Although only one processor element is shown, it should be noted that the computing device may employ a plurality of processor elements (e.g., multiple SOMs via multiple edge connectors of a baseboard). Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. For instance, the processing system 400 may represent network function virtualization infrastructure (NFVI), where a virtual machine (VM) or virtual network function (VNF) hosted thereon may perform the primary functions of a networking device (e.g., a CPE/NTE, NE router, etc.) utilizing the underlying NFVI hardware.

It should be noted that functions of a networking device of the present disclosure can be implemented in software and/or in a combination of software and hardware, e.g., using a SOM and/or SOC thereof that may comprise an application specific integrated circuit (ASIC), a programmable logic array (PLA), including a field-programmable gate array (FPGA), or a state machine deployed on a hardware device, a computing device, or any other hardware equivalents, e.g., computer readable instructions pertaining to the specific networking device operations can be used to configure/program the hardware processor element(s) 402.

In one example, instructions and data for the present module or process 405 (e.g., a software program comprising computer-executable instructions) can be loaded into memory 404 and executed by hardware processor element(s) 402 to implement the specific networking device functions intended for the processing system 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the specific networking device functions can be perceived as a programmed processor or a specialized processor. As such, the present module 405 (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. An apparatus comprising:
   a baseboard including:
      a baseboard management controller;
      an Ethernet bus;
      a first edge connector for at least one network interface module; and
      a second edge connector for a system-on-module;
   the at least one network interface module coupled to the Ethernet bus via the first edge connector; and
   the system-on-module coupled to the Ethernet bus via the second edge connector, the system-on-module including:
      a system-on-chip; and
      an Ethernet edge connection module coupled to the Ethernet bus via the second edge connector of the baseboard.

2. The apparatus of claim 1, wherein the Ethernet edge connection module is enabled to engage in Ethernet-based communication with at least one computing device external to the apparatus via the Ethernet bus and the at least one network interface module.

3. The apparatus of claim 1, wherein the first edge connector comprises a plurality of slots, wherein the at least one network interface module occupies at least one of the plurality of slots.

4. The apparatus of claim 3, wherein at least a second one of the plurality of slots is unoccupied and is available for installation of at least a second network interface module.

5. The apparatus of claim 1, wherein the at least one network interface module comprises at least one of:

a network adapter module;
a port interface module; or
a line card.

6. The apparatus of claim 1, wherein the at least one network interface module comprises at least one of:
a small form-factor pluggable module;
an enhanced small form-factor pluggable module;
a gigabit Ethernet small form-factor pluggable module; or
a power-over-Ethernet small form-factor pluggable module.

7. The apparatus of claim 1, wherein the at least one network interface module comprises an Ethernet physical layer module.

8. The apparatus of claim 7, wherein the Ethernet edge connection module is a component of the system-on-chip or is a component of the system-on-module that is distinct from the system-on-chip.

9. The apparatus of claim 1, wherein the Ethernet edge connection module comprises a media access controller.

10. The apparatus of claim 1, wherein the system-on-module further includes at least one of:
at least one memory module; or
a module power supply circuit.

11. The apparatus of claim 1, wherein the baseboard further includes at least one of:
a baseboard power supply circuit; or
at least one storage module.

12. The apparatus of claim 1, wherein the Ethernet bus comprises a media independent interface for the Ethernet edge connection module to communicate with the at least one network interface module.

13. The apparatus of claim 12, wherein the media independent interface comprises:
a gigabit media independent interface;
a serial gigabit media independent interface; or
a universal serial gigabit media independent interface.

14. The apparatus of claim 1, wherein the first edge connector comprises a pluggable interface to receive the at least one network interface module, and wherein the second edge connector comprises a pluggable interface to receive the system-on-module.

15. The apparatus of claim 14, wherein the system-on-module is removable from the second edge connector for installation of at least a second system-on-module.

16. A method comprising:
demounting a first system-on-module from a first edge connector of a baseboard of a networking device, the baseboard including:
a baseboard management controller;
an Ethernet bus;

the first edge connector, wherein the first edge connector is configured to receive the first system-on-module from among a plurality of available system-on-modules; and
a second edge connector for at least one network interface module, wherein the at least one network interface module is coupled to the Ethernet bus via the second edge connector; and
mounting a second system-on-module on the first edge connector of the baseboard, wherein the second system-on-module comprises:
a system-on-chip; and
an Ethernet edge connection module, wherein the Ethernet edge connection module is coupled to the Ethernet bus via the first edge connector of the baseboard as a result of the mounting.

17. The method of claim 16, wherein the Ethernet edge connection module is enabled to engage in Ethernet-based communication with at least one computing device external to the networking device via the Ethernet bus and the at least one network interface module.

18. The method of claim 16, further comprising:
mounting the at least one network interface module on the second edge connector.

19. A method comprising:
demounting a first network interface module from first a first slot of a first edge connector of a baseboard of a networking device, the baseboard including:
a baseboard management controller;
an Ethernet bus;
the first edge connector, wherein the first edge connector comprises a plurality of slots configured to receive a plurality of network interface modules; and
a second edge connector for a system-on-module, wherein the system-on-module includes:
a system-on-chip; and
an Ethernet edge connection module, wherein the Ethernet edge connection module is coupled to the Ethernet bus via the second edge connector; and
mounting a second network interface module on the first slot of the first edge connector of the baseboard, wherein the second network interface module is coupled to the Ethernet bus via the first edge connector of the baseboard as a result of the mounting.

20. The method of claim 19, wherein the Ethernet edge connector module is enabled to engage in Ethernet-based communication with at least one computing device external to the networking device via the Ethernet bus and the second network interface module.

* * * * *